(12) United States Patent
Willis

(10) Patent No.: US 6,326,620 B1
(45) Date of Patent: Dec. 4, 2001

(54) SWITCHED MODE NDIR SYSTEM

(75) Inventor: Peter M. Willis, Benton Harbor, MI (US)

(73) Assignee: Leco Corporation, St. Joseph, MI (US)

( * ) Notice: Subject to any disclaimer, the term of this patent is extended or adjusted under 35 U.S.C. 154(b) by 0 days.

(21) Appl. No.: 09/307,111

(22) Filed: May 7, 1999

(51) Int. Cl.[7] .......................... G01N 21/35; G01N 21/61
(52) U.S. Cl. ........................... 250/338.1; 250/339.13; 250/343
(58) Field of Search .................. 250/338.1, 338.3, 250/338.4, 338.5, 339.11, 339.12, 341.8, 343; 330/207 A

(56) References Cited

U.S. PATENT DOCUMENTS

| | | | |
|---|---|---|---|
| 3,793,525 | * | 2/1974 | Burch et al. ................... 250/343 |
| 4,996,431 | * | 2/1991 | Bonne et al. ................... 250/343 |
| 5,113,143 | * | 5/1992 | Wei ................................. 330/10 |
| 5,369,278 | * | 11/1994 | Lehto ............................. 250/343 |
| 6,114,700 | * | 9/2000 | Blades ........................... 250/343 |

FOREIGN PATENT DOCUMENTS

| | | | | |
|---|---|---|---|---|
| 0745840-A2 | * | 12/1996 | (EP) | ............... G01N/21/37 |
| 8-62040-A | * | 3/1996 | (JP) | ............... G01J/1/04 |

* cited by examiner

Primary Examiner—Constantine Hannaher
Assistant Examiner—Albert Gagliardi
(74) Attorney, Agent, or Firm—Price, Heneveld, Cooper, DeWitt & Litton

(57) ABSTRACT

A low noise amplifier circuit modulates input signals at a frequency of about 1 kHz, subsequently demodulates and filters the signals to provide an analog DC output level in which the 1/f noise of the amplifier is effectively eliminated due to the selection of the modulation frequency above the significant level of 1/f noise. Its application in a preferred embodiment is in an NDIR system using a detector having a DC emitter employed with a thermopile detector to provide an analog varying DC low level signal.

3 Claims, 1 Drawing Sheet

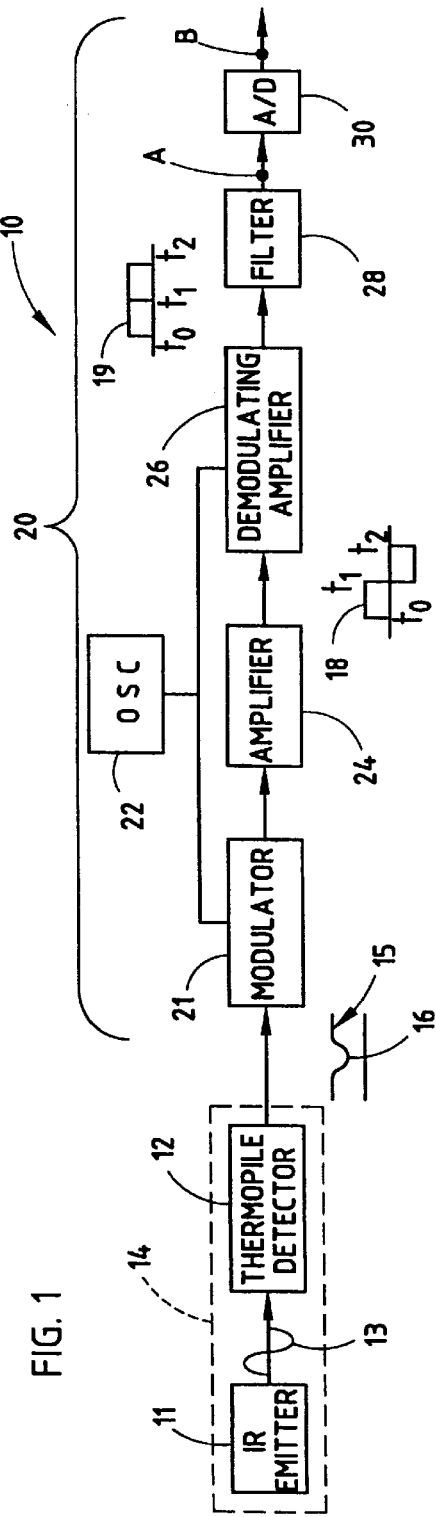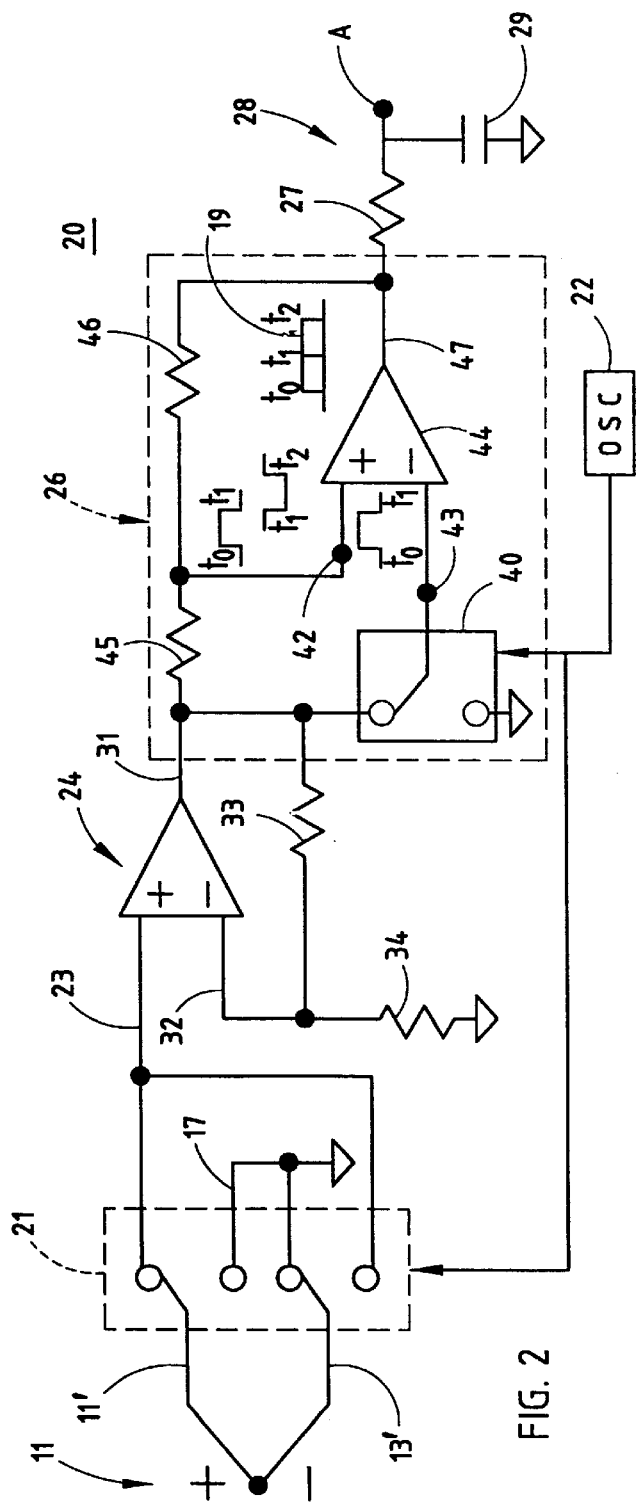

SWITCHED MODE NDIR SYSTEM

BACKGROUND OF THE INVENTION

The present invention relates to measurement devices and circuits and, in particular, a circuit for reducing the 1/f noise level of the detection circuit.

In most non-dispersive infrared detection applications (NDIR) using thermal detectors, the radiation source is modulated either because of the AC nature of the detector or to reduce the effects of stray radiation or temperature drifts. The infrared source could also be modulated by some mechanical means, such as a chopper wheel connected to a constant RPM motor to alternately pass and block the infrared radiation. Such an approach used with pyro-electric detectors requires the use of somewhat expensive precision motors, controllers, and chopper wheels precisely synchronized to provide the modulation and demodulation of signals.

In order to overcome the difficulties with such detection systems, it is desirable to use a DC system in which a thermopile is provided to detect the infrared radiation passing through an analyte, however, the use of such a detector requires a DC amplifier for providing a signal level which is representative of the nature of the analyte being detected as well as its concentration. DC amplifiers can be employed for such purpose, however, DC amplifiers inherently have internal noise referred to as 1/f noise which exponentially decreases with increasing frequency. Thus, at very low frequencies, the 1/f noise is significant and for use in NDIR systems with DC emitters, such noise adversely affects the resultant detected signal. The 1/f noise, however, decreases significantly at higher frequencies, such as 1 kHz and is negligible at or above such frequency.

SUMMARY OF THE INVENTION

The system of the present invention, however, provides low noise circuit which modulates input signals at a frequency of about 1 kHz, subsequently demodulates and filters the signals to provide an analog DC output level in which the 1/f noise of the amplifier is effectively eliminated due to the selection of the modulation frequency above the significant level of 1/f noise. Its application in a preferred embodiment is in an NDIR system using a detector having a DC emitter employed with a thermopile detector to provide an analog varying DC low level signal. Such a system, therefore, allows the use of a DC emitter which is more reliable than pulsed emitters and relatively inexpensive circuitry components to provide superior performance for a NDIR detection system used in connection with an analyzer.

These and other features, objects and advantages of the present invention will become apparent upon reading the following description thereof together with reference to the accompanying drawings.

BRIEF DESCRIPTION OF THE DRAWINGS

FIG. 1 is an electrical circuit diagram in block form of the system of the present invention; and FIG. 2 is an electrical circuit diagram, partially in block and schematic form, of the major components of the circuits shown in FIG. 1.

DETAILED DESCRIPTION OF THE PREFERRED EMBODIMENT

Referring initially to FIG. 1, there is shown a non-dispersive infrared (NDIR) detection system 10 for an analyzer (not shown). The system comprises a DC infrared emitter 11 which is mounted in a temperature-controlled cell 14 through which a carrier gas, such as helium, flows and into which flow stream an analyte is introduced. The infrared cell construction, together with the mounting of a thermopile detector 12 in the cell 14, is conventional. The analyte supplied to the cell 14 will include fluids and/or gases which absorb infrared radiation including, for example, NO, $CO_2$, $H_2O$, and the like as examples only.

The infrared emitter 11 emits infrared radiation 13 which passes through the analyte flowing between the emitter 11 and detector 12, which detector provides an analog DC varying output represented by waveform 15. which may, for a helium carrier, have an output of, for example, 40 millivolts and dip, as indicated by waveform section 16, to a level of, for example, 20 millivolts as an analyte passes through the cell 14. This low level time-varying DC analog signal is applied to the circuit 20 of the present invention to provide a noise-free amplified output signal at output terminal A. Circuit 20 includes a modulator 21 coupled to an oscillator 22 for modulating the time-varying signal 15 at a frequency which is above the significant 1/f noise level of a typical DC amplifier. In the preferred embodiment of the invention, oscillator 22 had a frequency selected at 1 kHz, although frequencies slightly below and significantly above could also be employed.

Modulator 21 chops the analog DC signal and selectively applies the positive and negative terminals of the detector to the input of an amplifier 24 which is an operational amplifier, as described in greater detail below in connection with FIG. 2, to provide an alternate polarity square-wave output signal 18. This output signal from amplifier 24 is applied to a demodulating amplifier 26 also coupled to the oscillator 22 for receiving signals therefrom to invert one half of the square-wave signal 18 to provide a unipolar output signal 19 therefrom which is applied to a low pass filter 28 passing frequencies substantially at 3 Hz or below. The DC level output from filter 28, in turn, is coupled to an A-to-D converter 30 having an output at terminal B comprising a binary number representing the detected signal level of an analyte to be analyzed. The signal from A-to-D converter 30 is conventionally applied to a microprocessor associated with an analyzer to provide the operator with a readable output which is representative of not only the analyte detected but the level of analyte in a given specimen. The analyzer infrared cell and the combustion furnace associated with such an analyzer can be conventional components and do not form part of the present invention other than the environment in which the circuit of the present invention is employed. Having briefly described the overall system of the present invention, a more detailed description of circuit 20 and its operation is now presented in connection with FIG. 2.

Referring now to FIG. 2, the thermopile detector 12 provides a polarized varying DC signal of, for example, 20 millivolts which drops, as indicated by waveform 15 in FIG. 1, 20 millivolts as an example when an analyte passes through the cell. The modulator 21 coupled to oscillator 22 comprises FET analog switches, such as Analog Device's Model ADG433 which is controlled by a signal from oscillator 22 to switch the polarity of the detector output signals on conductors 11' and 13' alternately to ground through conductors 17 or to the positive input 23 of amplifier 24. Thus, modulator 21, as shown schematically, constitutes, in effect, a two-pole, double-throw switch driven at 1 kHz to provide reverse-polarity signals to the positive input of amplifier 24. Amplifier 24 has an output 31 coupled to its negative input 32 by a 200 kOhm resistor 33. Negative input 32 is coupled to ground through a 1 kOhm resistor 34 with resistors 33 and 34 controlling the gain of amplifier 24 to approximately 200.

The switched polarity square-wave signal 18 at output 31 of amplifier 24 is essentially a 1 kHz square-wave having an amplitude of plus or minus 4 volts for the waveform 15 shown in FIG. 1 at the 40 millivolt level and plus or minus 2 volts when an analyte passes through infrared cell 14, as shown by section 16 of the waveform 15. It is noted that cell 14 has a controlled temperature environment such that temperature stability and drift is not a factor in connection with the signal detection and the analyzer's microprocessor discriminates between the steady state carrier gas flowing through infrared cell 14 and the signal change resultant from the presence of an analyte.

The output 31 of amplifier 24 is coupled to a demodulator 26 comprising a second analog switch 40 coupled to oscillator 22 and comprising a single-pole, double-throw switch selectively coupling the output terminal 31 of amplifier 24 to the positive input terminal of an operational amplifier 44 having its negative input terminal 42 coupled to output terminal 31 of amplifier 24 by means of a 10 kOhm resistor 45. Thus, the square-wave signal 18 at terminal 31 is continuously applied to the inverting input terminal 42 of amplifier 44, and oscillator 22 in connection with the analog switch 40 applies the positive half of square-wave 18 to the positive or non-inverting input 43 of amplifier 44. Amplifier 44 has unitary gain selected by resistors 45 and a feedback 10K resistor 46. From the time $t_0$ to $t_1$ comprising the positive first half of square-wave 18, therefore, the amplifier acts as a follower. During the second half of the square-wave cycle ($t_1$ to $t_2$), switch 40 moves from the position shown to ground so that only the $t_1$ to $t_2$ negative half of the square-wave 18 is applied to the inverting input 42 of amplifier 44. Amplifier 14 inverts the waveform to a positive form shown as waveform 48 at output terminal 47 of amplifier 44.

Waveform 19 comprises a varying DC level of composite square-waves, which have a transition noise at ti of a switching frequency of about 1 kHz and harmonics thereof. This switching noise is eliminated by the low pass filter 28 comprising a 100 kOhm resistor 27 and a 2.2 microfarad capacitor 29 coupled in a low pass filter configuration as shown in FIG. 2. The junction of resistor 27 and capacitor 29 is output terminal A which, as shown in FIG. 1, is coupled to the input of A-to-D converter 30. The terminal of capacitor 29 remote from such junction is coupled to ground. The signal output at terminal A of FIG. 2, therefore, is a filtered DC signal having a level representative of either the steady state carrier gas level, such as 4 volts, or a lower level such as 2 VDC reflective of the analyte detected and its quantity. The signal is essentially free of any 1/f noise which is internally generated by amplifier 24 in view of the utilization of a modulating and demodulating frequency essentially above the frequency of significant 1/f noise generated by the DC amplifier.

The conventional A-to-D converter 30 is a 24 bit A-to-D converter which has an eight-pole low pass filter selected at 2.6 kHz, such that in combination with filter 28, eliminates the switching transients and provides an output signal free of 1/f components. The resultant circuit allows use of a DC infrared emitter, a DC detector such as a thermopile, and DC amplifiers to provide a relatively low cost and yet stable NDIR sensing system having superior signal-to-noise characteristics, and one which is relatively compact and reliable in operation.

It will become apparent to those skilled in the art that various modifications to the preferred embodiment of the invention as described herein can be made without departing from the spirit or scope of the invention as defined by the appended claims.

The invention claimed is:

1. A detection system for use in connection with a DC infrared emitter in an NDIR system comprising:

an infrared detector in an NDIR system;

a modulator for chopping a DC signal from said infrared detector into components having a first predetermined frequency of about 1 kHz;

an amplifier coupled to an output of said modulator for amplifying signals from said modulator;

a demodulator coupled to an output of said amplifier and synchronized with said modulator for providing a DC level output signal therefrom;

a filter coupled to an output of said demodulator for filtering out signal components above a second predetermined frequency of about 3 Hz;

an A-to-D converter coupled to said filter for providing a binary signal output representative of the DC signal at the output of said filter;

an oscillator having a frequency of approximately 1 kHz and wherein said modulator and said demodulator are coupled to said oscillator, wherein said modulator includes a solid state analog switch coupled to said oscillator; and wherein said demodulator includes an operational amplifier and a solid state analog switch coupled to said oscillator for inverting one half of each cycle of signals from said amplifier.

2. An NDIR system for use in an analyzer comprising:

a DC infrared emitter;

an infrared detector spaced from said emitter;

a sample passageway extending between said emitter and said detector;

a modulator having an input coupled to said detector for dividing DC input signals from said detector into frequency components of a first predetermined frequency;

an amplifier coupled to an output of said modulator for amplifying signals from said detector;

a demodulator coupled to an output of said amplifier and synchronized with said modulator for providing a DC level output signal therefrom, wherein said modulator and said demodulator are coupled to an oscillator having a frequency of approximately 1 kHz and wherein said modulator includes a solid state switch having a control input coupled to said oscillator and said demodulator includes an operational amplifier and a solid state switch having a control input coupled to said oscillator for inverting one half of each cycle of signals from said amplifier; and a filter coupled to an output of said demodulator and filtering out signal components above a second predetermined frequency of about 3 Hz.

3. The system as defined in claim 2 and further including an A-to-D converter coupled to said filter for providing a binary signal output representative of the DC signal from said detector.

* * * * *